Oct. 12, 1965  MIKIHIKO HANAI  3,210,805
MOLDING MACHINES
Filed Feb. 28, 1961  4 Sheets-Sheet 2
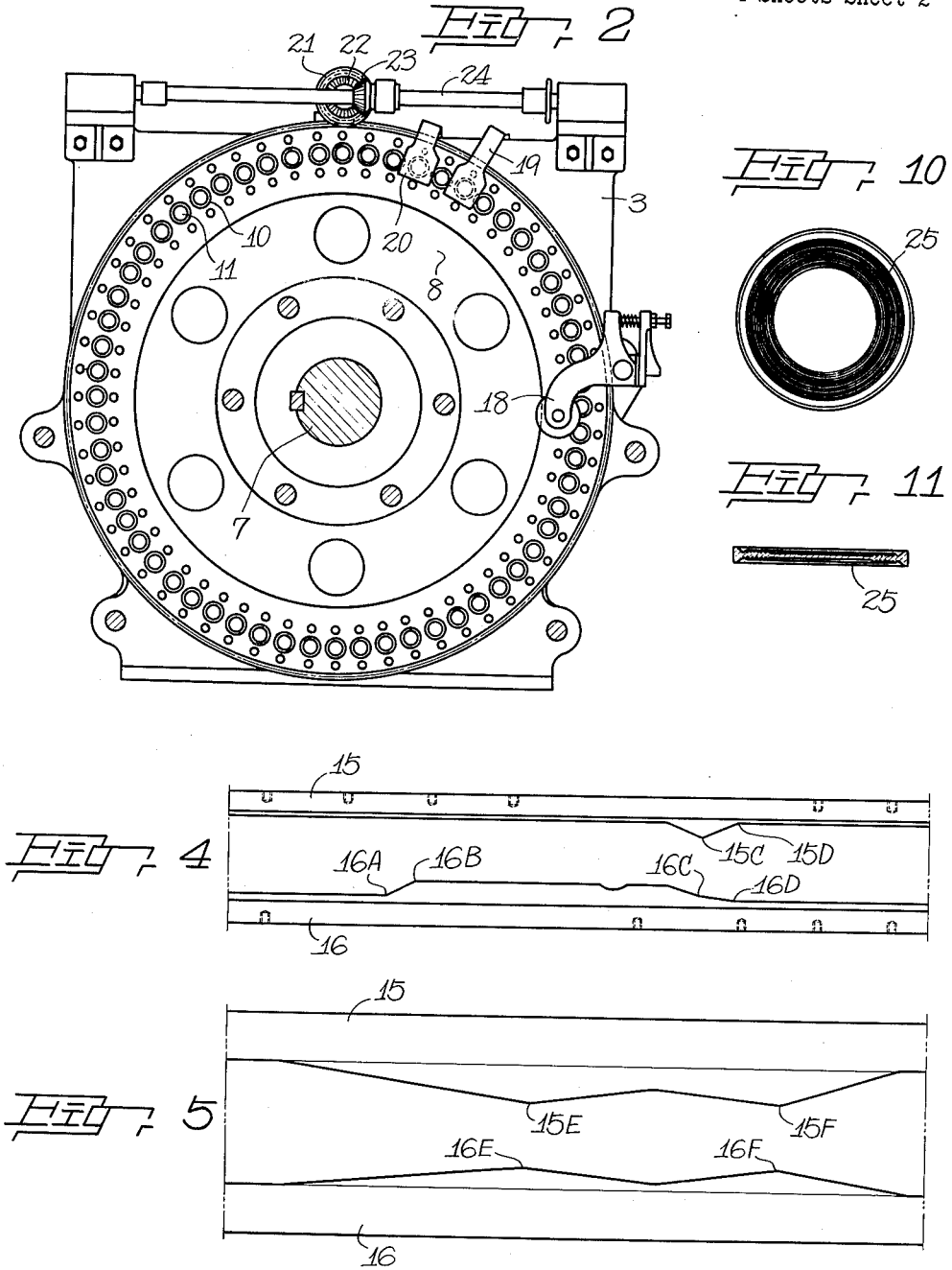
INVENTOR.
MIKIHIKO HANAI
BY Blum, Moscovitz,
Friedman & Blum
ATTORNEYS

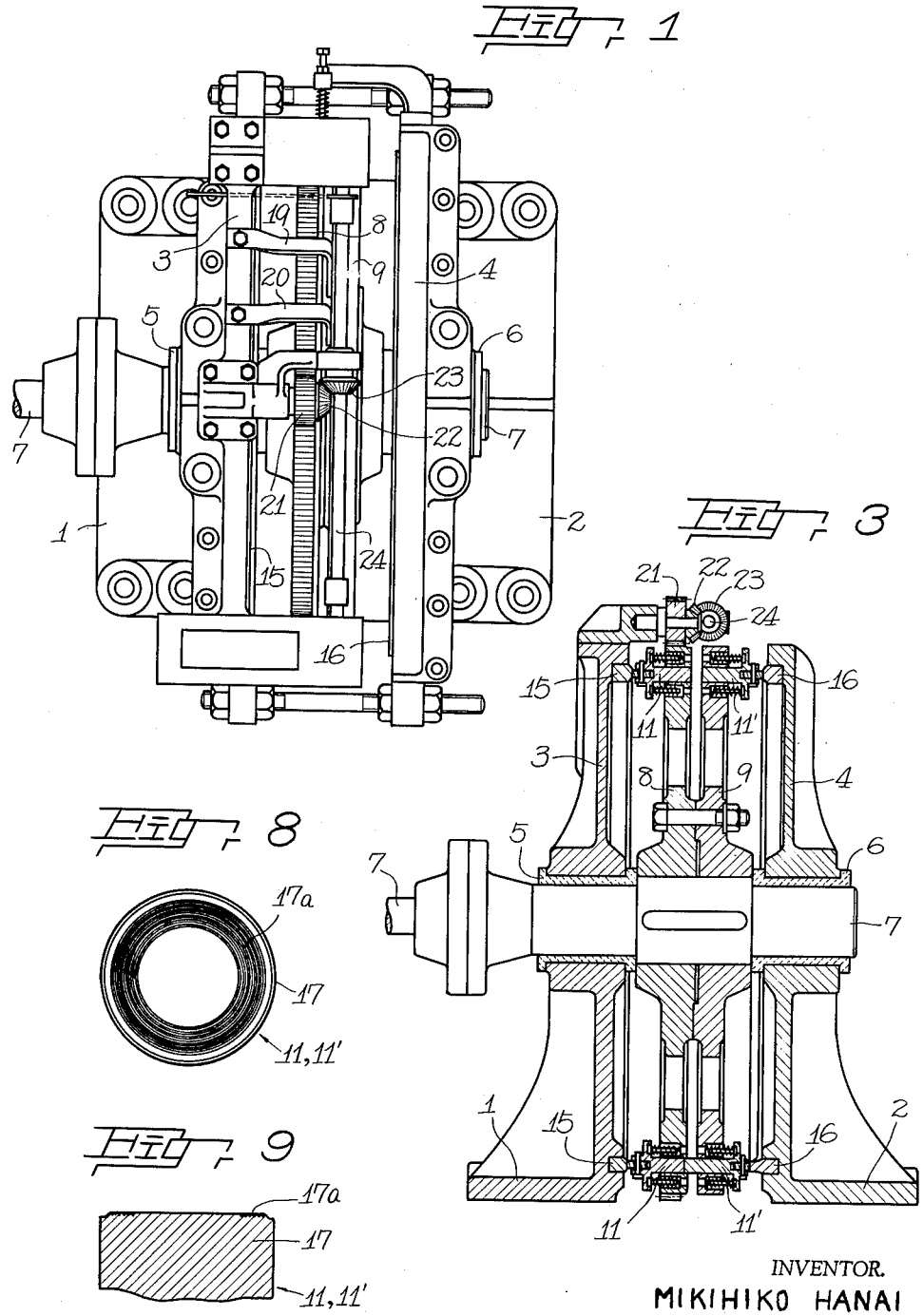

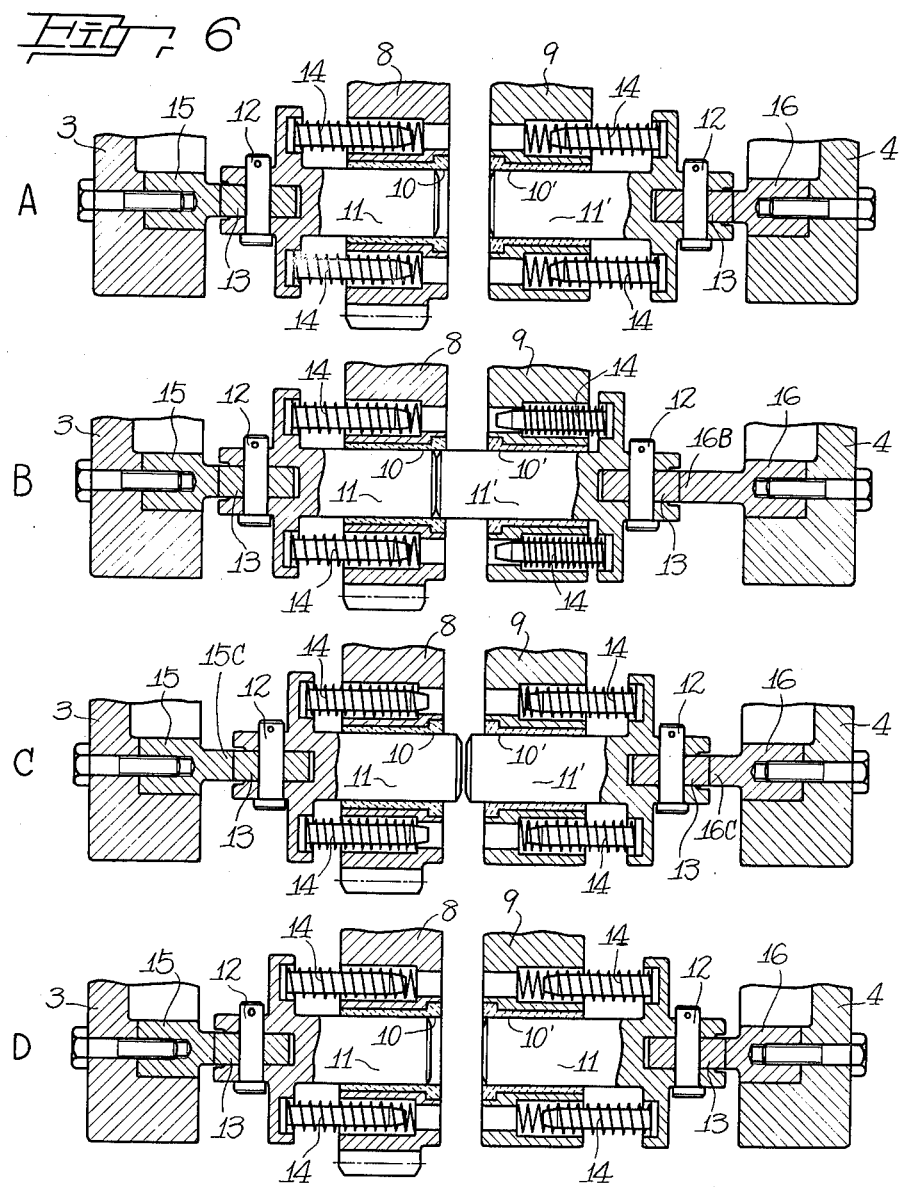

Oct. 12, 1965 MIKIHIKO HANAI 3,210,805
MOLDING MACHINES
Filed Feb. 28, 1961 4 Sheets-Sheet 4
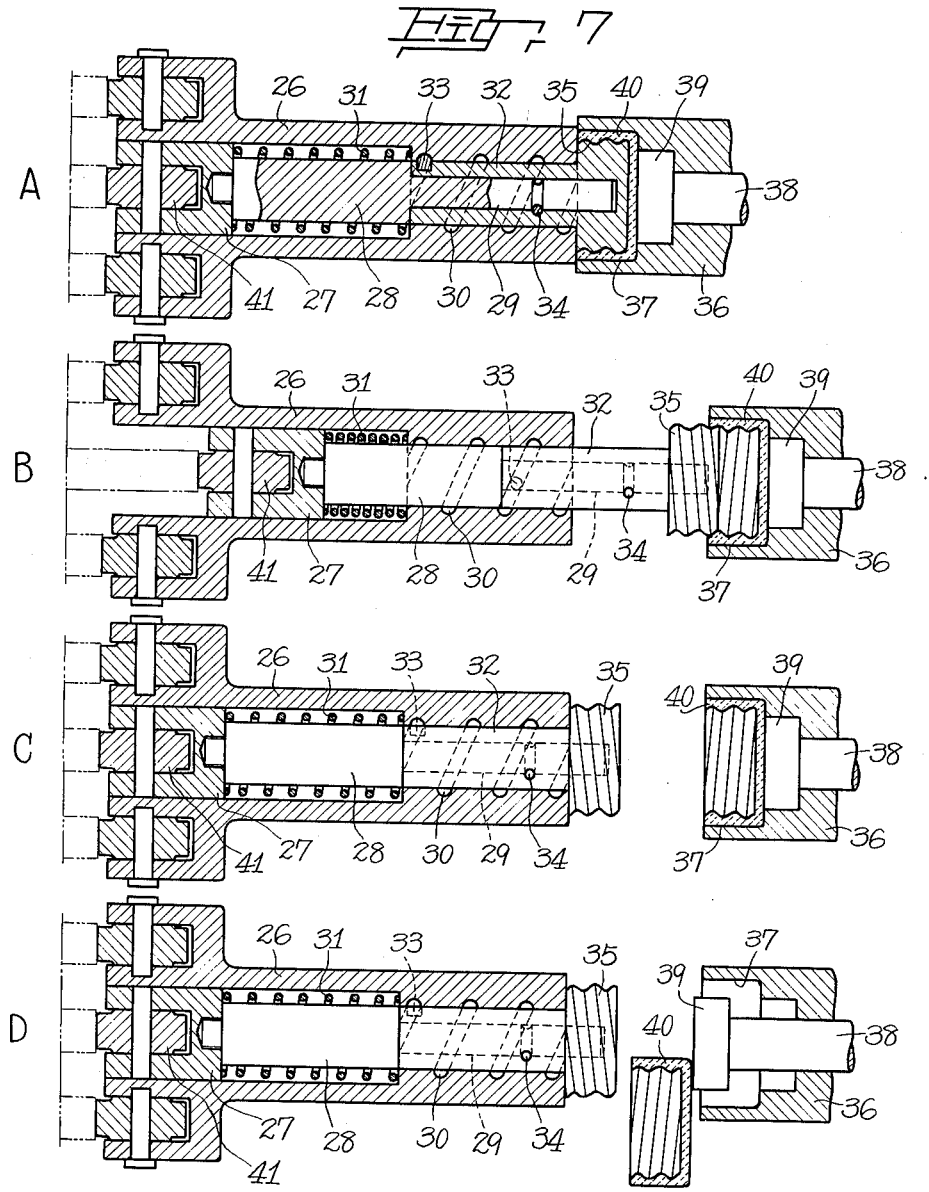
INVENTOR.
MIKIHIKO HANAI
BY Blum, Moscovitz,
Friedman & Blum
ATTORNEYS

United States Patent Office 3,210,805
Patented Oct. 12, 1965

3,210,805
MOLDING MACHINES
Mikihiko Hanai, 2 11-chome, Tsukishima-Higashina-
kadori, Chuo-ku, Tokyo, Japan
Filed Feb. 28, 1961, Ser. No. 92,307
2 Claims. (Cl. 18—20)

This invention relates to a molding machine for plastic packings, and more particularly to a molding machine for rapid and automatic production of plastic packings interposing between a bottle mouth and a crown cap or other caps.

It has heretofore been usual in the ordinary injection type molding machine or method that about three-fourths of material employed is wated and the method itself is very inefficient.

One object of this invention is to provide a molding machine for plastic packings from plastic tape in a gel condition by which such enormous loss of the material used can be eliminated and plastic packings best adapted to requirements can be produced at very high speed.

Another object of this invention is to provide an improved molding machine for plastic packings in which said plastic packings are molded between the two press molds arranged within the concentric cylinders by way of the reciprocal movement, i.e., forward and backward movements of these two press molds.

A further object of this invention is to provide an improved plastic packing to be interposed between a bottle mouth and a crown cap or other caps.

Other objects and features of this invention will become apparent on the reading of the following specification and claims in conjunction with the drawings.

Accordingly, the present molding machine in its preferred form consists of an extrusion disc and a coupling disc, both of which being mounted on a horizontal shaft driven freely and which comprising a number of cylinders provided around a fringe of each disc systematically with certain intervals so as to face to each other and each piston having a press mold on its tip being inserted in each of these cylinders to be slidable freely in an axial direction. These pistons in the cylinders of both extrusion disc and coupling disc according to the present molding machine are adapted to carry out three movements during a half rotation of these discs, i.e. (1) forward movement of the extrusion piston, (2) backward movement of the extrusion piston and forward movement of the coupling piston and (3) backward movement of both so that gel-formed plastic tape supplied gradually at one end of the row of pistons into the press mold by means of this systematic movement of pistons may be either cut to a desired size or pushed out at the other end of the row of pistons so as to form desired plastic packings, while a material remaining in the mold as residue may be scraped off constantly.

In order that the invention may be readily carried into effect, it will now be described with reference to the embodiment and the attached drawings, in which FIG. 1 is a top plan view of an embodiment of the present molding machine in accordance with this invention, FIG. 2 is a right side elevation of the machine shown in FIG. 1, FIG. 3 is a sectional elevation of the present machine, as viewed from the front, FIG. 4 is a developed view of a cam as shown in FIG. 3, FIG. 5 is also a developed view of an upper half of said cam, FIGS. 6A, B, C and D are the enlarged views of the disc portions of this molding machine, and in which drawings the change positions of the discs during one cycle of operation of the machine are shown, FIGS. 7A, B, C and D are enlarged views of other embodiments of cylinders and press molds used for molding caps and the like, these views also illustrating mechanisms used in the operation, FIG. 8 is a plan view of a press mold, FIG. 9 is a sectional view of the press mold of FIG. 8, FIG. 10 is a plan view of the plastic packing produced with the machine of the invention, and FIG. 11 is a sectional elevation of the plastic packing of FIG. 10.

The invention will be more clearly understood from the following description of an illustrative embodiment thereof, reference being made to the accompanying drawings.

Referring the drawings, there are arranged bearings 5 and 6 through the center of fixed plates 3 and 4 (see FIG. 3) which are secured to the base (not shown) by means of legs 1 and 2. A shaft 7 is rotatably supported through the bearings 5 and 6. Said shaft 7 is driven by means of a suitable transmission gear (not shown) to rotate in a counter-clockwise direction, while its speed is adjusted in a desired manner as shown in FIG. 2. There are mounted two discs, one a coupling disc 8 and the other an extrusion disc 9 on the shaft 7 between these bearings 5 and 6. These discs 8 and 9 being connected, are adapted to rotate concurrently together with the shaft 7, while peripheries of these discs keep proper distance with each other and also with the fixed plates 3 and 4.

Around the fringes of discs 8 and 9 there are formed 60 cylinders 10 and 10', all being same shape and at equal distance and extending parallel to the shaft 7. The same shaped pistons 11 and 11' are slidably set into each of these cylinders 10 and 10', respectively. Behind these pistons 11 and 11' there are arranged rollers 13 freely rotatable on pins 12, also springs 14 being attached to each cylinder. These springs serve to hold the moving pistons 11 and 11' backward in the cylinders as shown in FIG. 6. Along the peripheries of discs 8 and 9, there are cams 15 and 16 secured to the plates 3 and 4 as shown in FIG. 3.

FIG. 4 is a developed view of the cams 15 and 16, indicating the highest points at right and left ends and at the center the lowest point, that is to say, the cam 15 is raised once at the lower right point 15C, as seen in FIG. 4, while the cam 16 is raised at a little lower left point of the point 16B as in FIG. 2, keeping its raised position as against the right hight point of the cam 15C and then drops at 16C.

The cams 15 and 16 being so arranged that the roller 13 may be always pressed therewith and by the action of a spring 14 the roller 13 can rotate according to the aforementioned concave and convex portions of the cams, thus reciprocating slidably the pistons 11 and 11' inside the cylinders in conformity with the rotation of the discs 8 and 9. The plastic tape 25 is adapted from its one end to be inserted between each pair of pistons in succession, and one edge of this plastic tape is made thicker than the other edge. Explaining now its movement with reference to FIG. 6, it may be seen that pistons 11 and 11' of discs 8 and 9 being arranged all in pairs, during semi-circular course of their movement on the cams 15 and 16, then piston 11' of the extrusion side retreats to the point 16C and the piston 11 of the coupling side pushes out to the point 16C as shown in FIG. 6 and subsequently at the point of both pistons 11 and 11' retreat to their original positions (see FIG. 6D). During this process, gel-formed plastic tape 25 is cut to a desired size to form proper shapes with rings on fringe grooves impressed by a press mold 17 (FIGS. 8 and 9) having a circular stripe 17a at the end of the piston 11 on the coupling side, and subsequently they are carried on to a push-out device 18 at the right side in FIG. 2, where they are forced out as finished plastic packings having the structure illustrated in FIGS. 10 and 11. In the course of these steps, air is preferably blown therethrough by means of a blower (not shown) to cool the plastic packings.

In the meantime, the packing material which still remains stuck on the mold 17 is carried on from the right end to the left upper portion so that it can be scraped off by special scraping devices 19 and 20, as shown in FIGS. 1 and 2. Then the cams 15 and 16 and their opposing cams 15E and 15F, 16F being projected (see FIG. 5), pistons 11 and 11' are pushed out and by the scraping 19 and 20, the residues are scraped out. Furthermore, as the edge of the coupling disc 8 is in the form of a gear, it, working conjointly with a small gear 21, is adapted to rotate a pair of bevel gears 22 and 23 and move the horizontal shaft 24. In this way, an extruding device (not shown) for plastic tape 25 can be controlled by the edge of said coupling disc 8.

In case of molding the plastic cap in accordance with this invention, the cylinders 10 and 10' and pistons 11 and 11' are substituted with other ones respectively. More particularly, an inner diameter of the latter portion of a cylinder 26 (FIG. 7) is enlarged, within which a diameter of a piston 28 wound by a spring 31 is made small. A cylindrical leg 32 having a projection 33 at its inner end and having the same outer diameter with the piston 23 is inserted into a cylinder 26, both being secured by a pin 34. A male mold 35 having a spirally projected groove around its outer periphery is secured to the cylinder 26. Moreover, a spiral groove 30 is provided around an inner surface of the front portion of the cylinder 26 so that in accordance with the forward and backward movements of the projection 33 through said groove 30 a rotation can be given to the male mold 35. In addition, a roller 41 always urged against a backside cam is arranged in a back member 27 of the piston 28. Furthermore, a female mold 37 having a cavity at a central front end is adapted to hold the male mold 35 firmly, and a press plate 39 is also provided at a piston 38.

When a cap 40 is molded between the male mold 35 and the female mold 37, both cylinders 26 and 36 are made to separate from each other, then the spring 31 acts to retreat the piston 29 and in accordance with such movement, the projection 33 retreats back through the spiral groove 30 so that the male mold 35 is detached out of the cap 40 through rotation. Subsequently, the piston makes forward movement and the press plate 39 pushes down the cap 40 through the female mold 37.

One edge of the plastic tape 25 is made thicker than another so that it is easy for the tape 25 held between two press molds to take a semi-circular course during the operation.

The molding machine according to the present invention is characterized in that the plastic tape 25 in the gel condition is punched into the desired plastic packings in succession having the corresponding shape and size, and then subjected to pressing so as to give the stripes by way of the two press molds 17 and 17' secured at each end of the pistons 11 and 11' reciprocating within the cylinders 10 and 10'.

As above mentioned, this machine has 60 pairs of pistons, half of which are in constant working order. While the shaft 7 is rotating at 5 r./m. speed, 300 packings are produced per minute. Then, there is an advantage of minimizing loss of materials and saving of man power, as the entire working is carried on automatically, except when plastic tape is supplied to the machine.

It will be apparent that the embodiment shown is only exemplary and that various modifications can be made in construction and arrangement within the scope of the invention as defined in the appended claims.

I claim:

1. A molding machine for producing plastic packings from a plastic tape in gel condition, said machine comprising a longitudinally extending shaft, means rotating said shaft, facing extrusion and coupling discs respectively transversely and concentrically mounted on said shaft, longitudinally extending cylinders respectively mounted on the proximate end faces of said discs in circumferentially spaced and opposingly paired relation, pistons respectively longitudinally slidably received within said cylinders, spring means respectively urging said pistons into retracted position in their cylinders wherein the piston of the coupling disc cylinder is recessed within the cylinder and the piston of the extrusion disc cylinder is flush therein, cooperating die tools on the facing ends of said pistons, and means operative on said pistons when said tape is interposed between respective pistons to first expel the extrusion disc piston while the coupling disc piston is retracted and thereby punch a packing blank from said tape and convey the tape into the recess in the coupling disc cylinder and then to move said pistons to intermediate positions under pressure against each other to form the packing from the blank by said tools and finally to retract said pistons to release said packing.

2. A molding machine in accordance with claim 1, said die tools respectively having thickened outer peripheral portions with mating corrugations so as to corrugate the outer peripheral portion of the packing and make the center portion thereof concavo-convex.

References Cited by the Examiner
UNITED STATES PATENTS

| | | | |
|---|---|---|---|
| 1,958,199 | 5/34 | Morin. | |
| 1,959,612 | 5/34 | Burke. | |
| 2,027,915 | 1/36 | Kux | 18—20 |
| 2,260,456 | 10/41 | Johnson | 18—20 |
| 2,354,029 | 7/44 | Kingston | 18—20 |
| 2,363,808 | 11/44 | Sayre. | |
| 2,440,366 | 4/48 | Cropp | 18—20 |
| 2,862,232 | 12/58 | Rekettye | 18—2 XR |
| 2,864,123 | 12/58 | Gora | 18—20 XR |
| 2,984,862 | 5/61 | Chabotte | 18—2 |

WILLIAM J. STEPHENSON, *Primary Examiner.*

NEDWIN BERGER, *Examiner.*